United States Patent
Weinmann

(10) Patent No.: US 6,940,237 B2
(45) Date of Patent: Sep. 6, 2005

(54) WASHING MACHINE WITH BRUSHLESS COMMUTATING DRIVE MOTOR

(75) Inventor: Martin Weinmann, Bad Waldsee (DE)

(73) Assignee: Diehl AKO Stiftung & Co. KG, Wangen (DE)

(*) Notice: Subject to any disclaimer, the term of this patent is extended or adjusted under 35 U.S.C. 154(b) by 0 days.

(21) Appl. No.: 10/802,356

(22) Filed: Mar. 16, 2004

(65) Prior Publication Data

US 2004/0201360 A1 Oct. 14, 2004

(30) Foreign Application Priority Data

Apr. 11, 2002 (DE) .......................................... 103 16 878

(51) Int. Cl.[7] .............................................. D06F 33/02
(52) U.S. Cl. ..................................... 318/254; 68/12.16
(58) Field of Search ................................ 318/138, 254, 318/439, 720–724; 68/12.01, 12.02, 12.16; 388/907.5

(56) References Cited

U.S. PATENT DOCUMENTS

| | | | | |
|---|---|---|---|---|
| 4,446,706 A | * | 5/1984 | Hartwig | 68/24 |
| 4,803,408 A | | 2/1989 | Uhde et al. | |
| 5,233,847 A | * | 8/1993 | Tanaka | 68/12.04 |
| 6,008,603 A | | 12/1999 | Jones et al. | |
| 6,041,625 A | * | 3/2000 | Nagai et al. | 68/12.02 |
| 6,078,161 A | * | 6/2000 | Kim et al. | 318/701 |
| 6,108,488 A | * | 8/2000 | Haner | 388/811 |
| 6,249,094 B1 | | 6/2001 | Zeh et al. | |
| 6,737,828 B2 | * | 5/2004 | Kiuchi et al. | 318/779 |
| 6,834,407 B2 | * | 12/2004 | Stephens | 8/158 |

FOREIGN PATENT DOCUMENTS

| | | |
|---|---|---|
| DE | 36 04 238 A1 | 8/1987 |
| DE | 196 37 161 A1 | 3/1998 |
| DE | 198 09 769 A1 | 9/1999 |
| EP | 0 254 537 A2 | 1/1988 |

* cited by examiner

*Primary Examiner*—Bentsu Ro
(74) *Attorney, Agent, or Firm*—Laurence A. Greenberg; Werner H. Stemer; Ralph E. Locher

(57) ABSTRACT

In a synchronous motor with a permanent-magnet rotor for driving a washing machine to make commutation which is sensor-controlled in dependence on the rotary position of the rotor more precise, it is no longer the movement of the magnetic rotor dipole magnetic field past magnetic field sensors installed in the region of the air gap between the stator and the rotor that is interrogated. Rather an angular resolution and commutation triggering are improved by a relatively large number of actuators on an actuator disc that is non-rotatably connected directed to the rotor being interrogated. The actuators trigger, in an incremental pulse sender, counting pulses for a counter whose counting position that has been balanced up in dependence on direction of rotation specifies the instantaneous angular position of the disc and thus the rotor relative to the stator.

11 Claims, 1 Drawing Sheet

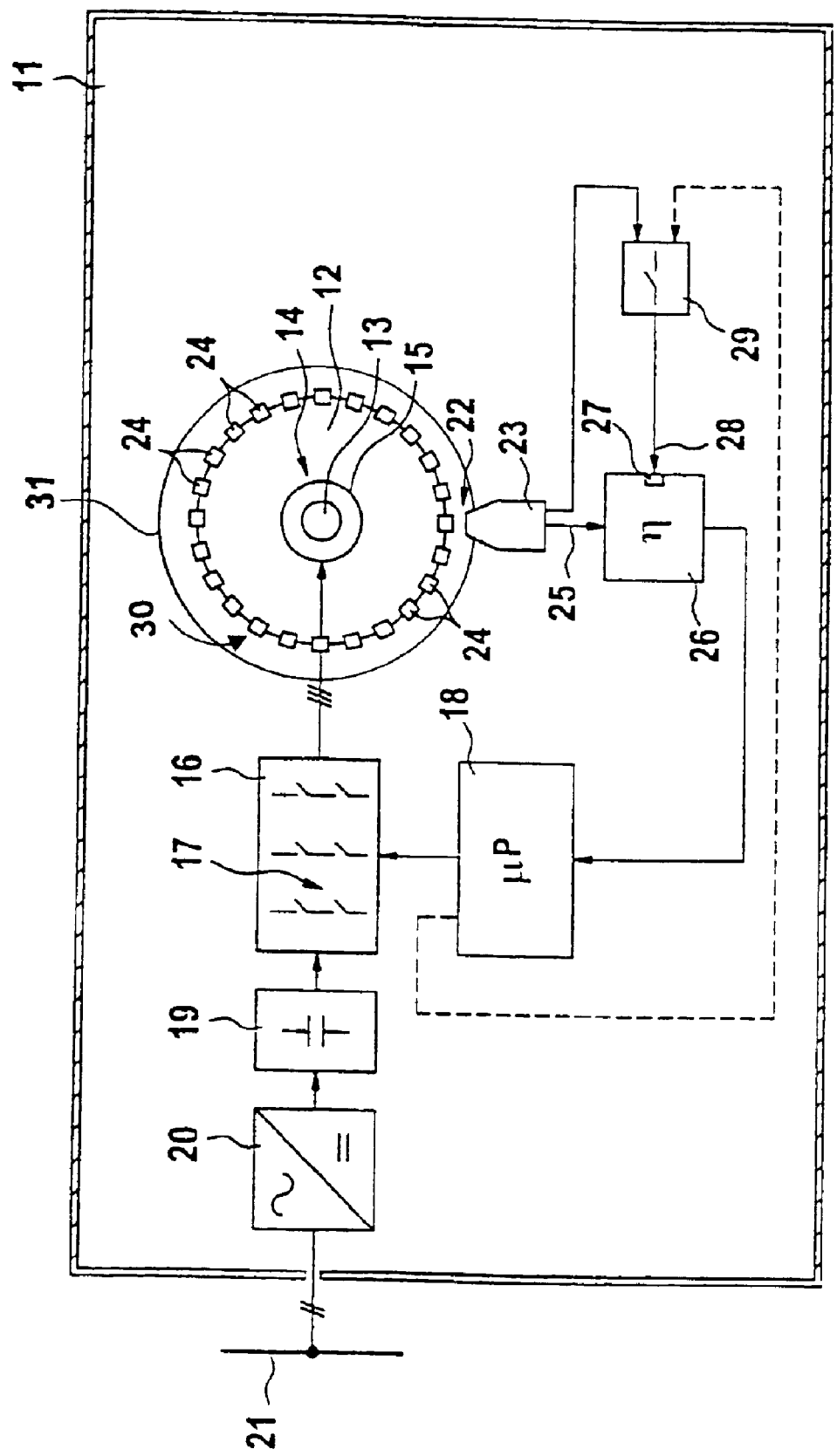

WASHING MACHINE WITH BRUSHLESS COMMUTATING DRIVE MOTOR

BACKGROUND OF THE INVENTION

Field of the Invention

The invention concerns a washing machine with a drive motor for operating a washing drum of the washing machine. The drive motor commutating brushlessly by way of a processor-controlled inverter.

It is conventional practice in the market to equip washing machines with such drive motors as are described for example in U.S. Pat. No. 6,008,603. Commutation of the motor current in dependence on the instantaneous rotary angle position of the permanent-magnetic rotor in the drive motor is effected by sensor signals which are fed into the motor control system and which are generated by magnetic field sensors which in the air gap between the stator and the rotor of the motor detect when a pole of the rotor passes through a reference position fixed with respect to the machine and signal to the processor control system for an inverter for control in proper phase relationship of the speed of rotation of the stator rotating field and thus for presetting the speed of rotation of the rotor.

Brushless, electrically commutating permanent-magnet motors of that kind are suitable in terms of operational technology as speed-controllable drive motors for the washing drums in washing machines. A disadvantage however is that a number of magnetic field sensors have to be installed in such a motor along the periphery of the hollow-cylindrical air gap between the stator and the rotor. That is critical, or at least expensive, for reasons of space; and it reduces the mechanical and electrodynamic properties of the motor because the magnetic field sensors are installed in cavities in stator poles, with the cavities opening towards the center of the rotor. In addition, there is the functional disadvantage that such magnetic field sensors already respond to the wide leakage field of a rotor dipole and therefore do not provide signal delivery which is particularly exact in terms of angle, upon the attainment of a given rotary angle position of the rotor, which is crucial for an optimum commutation procedure.

SUMMARY OF THE INVENTION

It is accordingly an object of the invention to provide a washing machine with a brushless commutating drive motor that overcomes the above-mentioned disadvantages of the prior art devices of this general type. In consideration of those aspects, the technical object of the present invention, for an optimized commutation procedure in washing machine drives, is to more precisely detect the position of the rotor relative to the stator, and that being affected even without having to implement mechanical interventions in the motor structure.

With the foregoing and other objects in view there is provided, in accordance with the invention, a washing machine. The washing machine contains a washing drum, a drive motor for operating the washing drum and having a rotor and a stator, and a processor-controlled inverter connected to and controlling the drive motor. The drive motor commutates brushlessly by way of the processor-controlled inverter. An actuator disc is connected non-rotatably to the rotor of the motor. The actuator disc has an incremental sensor with mutually spaced actuators disposed along a path of rotary movement. A pulse sender is fixed with respect to the washing machine. In a course of the actuators moving past the pulse sender, the actuators trigger incremental counting pulses. An incremental counter counts the incremental counting pulses for determining information about an instantaneous angular position of the rotor relative to the stator. A processor is connected to and controls the inverter and is further connected to the incremental counter. The processor receives the information about the instantaneous angular position from the incremental counter.

In accordance with the invention, the object is attained in that the rotor position relative to the motor stator is no longer detected directly by way of the rotor magnetic field by a magnetic field sensor at the air gap of the motor, but with a substantially greater level of rotary angle resolution by a rotary movement incremental sender which is non-rotatably coupled to the washing drum shaft.

This configuration provides that there is no longer any need to intervene in the air gap region which is critical in terms of the efficiency of the motor in order to detect the rotor angle position triggering the respectively imminent commutation procedure, because that position is now detected indirectly—outside the motor—and with an enhanced level of angle resolution. The step of switching over the field windings for a rotating rotary field in the drive motor, which is takes place in dependence on the instantaneous rotary position of the permanent-magnetic rotor, can now also take place with a very much greater degree of precision than when deriving it from the widely scattering rotor dipole field, for the reason that it is possible to use a sensor system which responds in a more defined manner and which in particular is an optoelectronic system for obtaining incremental counting pulses.

Now therefore, instead of the magnetic field sensors for rotary angle detection of the rotor, the configuration has an incremental counting system which is based on causing actuators disposed equidistantly in relation to the periphery of the washing drum, on an actuator disc carried by the shaft of the drum or the rotor of a direct drive, to act on a pulse sender which is fixed with respect to the machine and the pulse delivery of which is summed by a counter which can be synchronized into a defined initial position. In relation to that defined initial position therefore, corresponding to the sequence of the actuators and thus each counting position there is a given rotary angle position of the washing drum and therewith also the rotor of its drive motor, which is non-rotatably connected to the shaft thereof. Therefore the large number of counting pulses occurring with a revolution of the drum at the shaft thereof affords a correspondingly high level of resolution in terms of continuously detecting the rotary is angle of the rotor for initiating the commutation procedure, in the correct angular relationship, between the field windings for the rotary field in the motor actuating system.

Preferably the pulse sender which is fixed with respect to the stator is respectively excited by a pair of actuators which are slightly in phase-displaced relationship and which are therefore displaced relative to each other in the direction of movement, or however each of the equidistantly successive actuators excites two pulse senders which are displaced slightly relative to each other in the direction of movement of the actuators in a manner which is known per se, it is then possible to derive from that double pulse sequence the direction of movement of the actuators relative to the pulse sender—and thus the currently prevailing direction of rotation of the drum—for operation of the incremental counter, which at the present time is balancing in a summing or subtracting mode.

The counter is synchronized at any event at the beginning of operation into a counting reference position, preferably by being reset to the counting value ZERO. That is preferably also affected thereafter periodically during operation, in particular with each integral multiple of the full revolution of the washing drum. For that purpose, there can be provided a further actuator which acts on a pulse sender only one during a revolution of the washing drum and which is detected for example on an axially displaced rotational track by a pulse sender specifically associated therewith; or however a defined configuration of a plurality of actuators in a reference position with respect to the washing drum results in a single defined multiple pulse delivery per revolution of the washing drum, which at the beginning of operation is decoded for synchronization of the counter to that rotary angle reference position, and then during operation is filtered out or in some other way suppressed in order not to falsify the rotary angle-dependent counter operation.

Such synchronization of the incremental counter to the rotation of the drum can however also be effected at the beginning of operation of the washing process without resolution and evaluation of an additional single pulse delivery, more specifically by a procedure whereby, at the beginning of operation, the motor is first fed with a strong direct current through a spatially defined diametrally pairing of stator field coils whose dipole field consequently next rotates the permanent-magnetic rotor into that stator position. The incremental sender can now be initialized, that is to say the counter is set for that rotor angle position into the counting initial position. Then from that defined initial position the motor is then set in operation by way of the actuation of the inverter connected upstream thereof. The counting result that thus goes up again specifies the angular position of the rotor relative to that initial position in operation, because the number of counting pulses per revolution of the drum is structurally predetermined by the predetermined number of actuators for the resolution of counting pulses. The currently prevailing counting result thus provides for highly precise commutation of the motor current, in dependence on the currently prevailing rotary angle position of the rotor, by way of switching over the inverter to supplying current to the pair of field coils respectively next following in the direction of rotation. Rotational position-dependent counter synchronization without having recourse to counting pulses of the incremental sensor is also possible during ongoing operation, so that the counter status of the incremental sender can be continuously checked or corrected. For that purpose, it is possible to have recourse to the process described in greater detail in U.S. Pat. No. 6,249,094, for deriving the position of the rotor from detection, during a gap in the current in a stator coil line (for example during a prolonged zero-passage of a quasi-sinusoidal motor current), of the terminal voltage just being induced in that line by the rotating rotor and the phase position thereof, with respect to the stator current through that line.

In accordance with an added feature of the invention, a synchronization logic unit is connected to and sets the incremental counter to an initial counting position at a predetermined initial position of the path of rotary movement of the washing drum which is non-rotatably connected to the actuator disc and the rotor.

In accordance with an additional feature of the invention, an addition actuator is disposed on the actuator disc for activating the synchronization logic unit.

In accordance with a further feature of the invention, the actuator disc has a marked discontinuity oriented to a magnetic field of the rotor in a spatially fixed and pre-known relationship and the synchronization logic unit is activatable thereby. The marked discontinuity is in a form of interrupted or multiple pulse deliveries from the pulse sender.

In accordance with another feature of the invention, the processor causes a steady feeding of direct current to the drive motor at a beginning of operation until the rotor, being a permanent-magnetic rotor, has rotated relative to the stator into a rotary position corresponding to that field direction, whereupon the synchronization logic unit is activated and operation of the drive motor is started with a rotating field by way of the process-controlled inverter.

In accordance with yet another feature of the invention, the pulse sender operates optoelectronically in a manner of a transmission-type light barrier configuration and a spacing of the actuators on the actuator disc defining a sequence of openings. Alternatively, the actuators are reflectors and the pulse sender operates optoelectronically in a manner of a reflection-type light barrier configuration with a sequence of the actuators being reflectors disposed on the actuator disc.

In accordance with a further added feature of the invention, the incremental sensor supplies pairs of counting pulses, the pairs being phase-displaced relative to each other, wherein any change in a direction of rotation of the rotor and thus the washing drum relative to the pulse sender which is fixed with respect to the washing machine is derived from a sequence of the counting pulses, for switching over a counting direction in the incremental counter.

In accordance with another further feature of the invention, the synchronization logic unit responds to in-phase relationship of a motor current with a terminal voltage induced by the rotor during a passage through zero of the motor current through that winding line of the stator.

In accordance with a concomitant feature of the invention, the number of actuators on the actuator disc is an even multiple of the number of magnet dipoles of the rotor.

Other features which are considered as characteristic for the invention are set forth in the appended claims.

Although the invention is illustrated and described herein as embodied in a washing machine with a brushless commutating drive motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block circuit diagram abstracted to what is essential for a functioning washing machine drive with brushless sensor-controlled commutation by way of its processor-controlled inverter and according to the invention.

DESCRIPTION OF THE PREFERRED EMBODIMENTS

Referring now to the single FIGURE of the drawing in detail, there is shown a washing machine 11 having a housing in which a washing drum 12 of the washing machine 11 is mounted rotatably about a substantially horizontal axis, with the washing drum 12 being non-rotatably connected to a permanent-magnetic rotor 13 of a synchronous drive motor 14. That connection which is structurally rigid in terms of angle can be embodied by a transmission, preferably a chain or toothed belt transmission; primarily however the configuration of a direct drive will be selected, in which the rotor 13 is non-rotatably connected to a shaft of the washing drum 12.

The drive motor 14 is a brushless dc voltage motor or synchronous motor whose permanent-magnetic rotor 13 rotates with the rotary field produced in a stator 15 by a program-controllable inverter 16. The rotary field is produced by a multi-phase winding system in the stator 15, which is supplied with current periodically and in phase-displaced relationship by a correspondingly multi-phase inverter 16. For that purpose half-bridges 17 of the inverter 16, which are associated with the respective winding lines of the stator 15, are cyclically actuated from a processor 18 in per se known manner in such a way that the rotary field which rotates at the desired angular speed is produced in the stator 15 of the drive motor 14. The electrical energy for that purpose is taken from a capacitive storage of a dc intermediate circuit 19 which is charged up again from the general ac voltage network 21 by way of an ac voltage to dc voltage converter 20.

For the continuous rotary movement of the rotor 13, upon the attainment of a given rotary angle position of the rotor 13 relative to the stator 15, there must be a transition from the half-bridge 17 of a stator coil pair to the next one, that is to say, the supply of current must be advanced from one winding line to the next. To provide for that commutation procedure, it is now no longer provided that the position of the permanent-magnetic rotor 13 with respect to the stator 15 is detected directly by a magnetic field sensor installed in the motor 14, but rather the angular position, which is identical to the rotary angle position of the rotor and the rotary angle position of the washing drum, of an actuator disc 30 which in turn is non-rotatably connected to the shaft of the drum 12 or of the rotor 13, relative to the wash tub 31 in which the drum 12 rotates, that is to say also relative to the stator 15 of the motor 14. Because the resolution of the actuator disc 30 can be substantially greater than the number of magnetic rotor dipoles of the rotor 13 and because the widely scattering rotor dipole field is no longer detected by the sensor, that operation of externally ascertaining the rotary angle by way of an incremental counter for the commutation operation affords a substantially higher level of angle resolution, that is to say, by way of a more precise commutation operation, it affords smoother running even at extreme rotary speeds or load moments.

Continuous incremental detection of the instantaneous rotary angle position of the rotor 13 is preferably effected by an optoelectronic incremental sensor 22 operating as a light barrier configuration. A pulse sender 23 thereof reacts to the passage of actuators 24 which are fixed to or provided on the disc 30 along a circle that is coaxial with the axis of rotation. The actuators 24 can be for example a sequence of reflectors which, as they pass, excite the pulse sender 23 in the form of a reflection light barrier configuration; or a sequence of aperture holes along the periphery of the disc 30, which are displaced between the transmitter and the receiver of a fork-type light barrier configuration (also referred to as a transmission-mode light barrier configuration) as the pulse sender 23. This is not illustrated in greater detail in terms of its structure in the drawing as the pulse senders 23 of that kind in the form of light barrier configurations are commercially available.

The sequence of incremental counting pulses 25 furnished by the pulse sender 23 in the course of the rotary movement of the disc 30 is summed in an incremental counter 26 which, contrary to the symbolic representation showing the principle involved in the drawing will in practice be embodied in the context of the processor 18 for actuation of the inverter 16. The currently prevailing counting results corresponds to a currently prevailing rotary angle position of the disc 30 and thus the rotor 13 in the motor 14. The possibility of detecting the direction of rotation of the washing drum 12 by phase-shifted double pulses by way of pulse sequence evaluation and accordingly counting the pulses 25 at the counting input of the counter 26 alternatively upwardly or downwardly in order to take account of the currently, prevailing direction of rotation of the drum 12 in the incremental angle-determining procedure is not set forth in the drawing.

In order to provide angular position information which is related to the stator 15 and which is therefore absolute information, the counter 26 must be initialized in a defined initial rotary angle position of the washing drum 12, namely it must be set to a defined initial counting position (preferably to the counting value ZERO). The synchronization of the counter 26 to the rotary movement of the rotor 13 is effected by way of a setting input 27 by an item of synchronization information 28 that is supplied by a synchronization logic unit 29 symbolically indicated in the form of a switch.

The synchronization logic unit 29 can respond to the fact that, in the course of the per se equidistant configuration of the actuators 24 along the disc 30, for each revolution, there is one single time a significant interruption or multiple excitation which is detected once at the beginning of operation or periodically as the reference rotary position of the drum and resets the counter 26 by a synchronization pulse 28 by way of the setting input 27 to the predetermined initial counting position (preferably to ZERO). The counter program takes account of the fact that that reference pulse delivery is evaluated only as one counting pulse in order not to falsify the counting process that is dependent on the rotary angle.

Instead of that however, prior to the beginning of operation of the washing machine 11, the motor 14 can also be operated by way of one of the half-bridges in the inverter 16 in single-phase mode with direct current for producing a stationary bipolar stator magnetic field so that the permanent-magnetic rotor 13 rotates into that angular position; whereby then (this being the alternative shown in broken line in the drawing) the synchronization pulse 28 is triggered by way of the processor 18.

If the currently prevailing counting position of the counter 26 is synchronized to the currently prevailing initial rotary position of the disc 30 and thus the drum and the rotor 13, then the rising counting results corresponds to the progressing rotary movement of the disc 30 and thus again the rotor 13, and the counter 26 at the given time supplies the processor 18 with the angular information for commutation of motor actuation by way of the inverter 16.

In order therefore in particular in the synchronous motor 14 with the permanent-magnet rotor 13 to make commutation which is sensor-controlled in dependence on the rotary position of the rotor more precise, in accordance with the invention it is no longer the movement of the magnetic rotor dipole magnetic field past magnetic field sensors (installed in the motor 14 itself, therein in the region of the air gap between the stator 15 and the rotor 13) that is interrogated; but rather angular resolution and commutation triggering are substantially improved by a relatively large number (preferably larger than the number of magnet dipoles of the rotor) of actuators 24 on the disc 30 which is non-rotatably connected directed to the rotor 13 being interrogated, the actuators 24 which are fixed with respect to the disc 30 trigger, in an incremental pulse sender 23 which is fixed with respect to the appliance, counting pulses 25 for an incremental counter 26 whose counting position which has been balanced up specifies the instantaneous angular position of the disc 30 and thus also the drum as well as the rotor 13 relative to the stator 15 if the counter 26 was previously synchronized to a reference rotary position of the disc 30. Synchronization of the incremental counter 26 which balances up in dependence on direction of rotation can be effected at the beginning of operation with rotation of the rotor 13 into a defined, initially still stationary stator field, and then periodically during operation by a significant pulse delivery or by evaluation of the induced stator terminal voltage at a temporarily current-less coil line.

I claim:

1. A washing machine, comprising:
   a washing drum;
   a drive motor for operating said washing drum and having a rotor and a stator;
   a processor-controlled inverter connected to and controlling said drive motor, said drive motor commutating brushlessly by way of said processor-controlled inverter;
   an actuator disc connected non-rotatably to said rotor of said motor, said actuator disc having an incremental sensor with mutually spaced actuators disposed along a path of rotary movement;
   a pulse sender fixed with respect to the washing machine tub, and in a course of said actuators on said actuator disc moving past said pulse sender trigger incremental counting pulses;
   an incremental counter counting the incremental counting pulses for determining information about an instantaneous angular position of said rotor relative to said stator; and
   a processor connected to and controlling said inverter and further connected to said incremental counter, said processor receiving the information about the instantaneous angular position.

2. The washing machine according to claim 1, further comprising a synchronization logic unit connected to and setting said incremental counter to an initial counting position at a predetermined initial position of the path of rotary movement of said washing drum which is non-rotatably connected to said actuator disc and said rotor.

3. The washing machine according to claim 2, further comprising an addition actuator disposed on said actuator disc for activating said synchronization logic unit.

4. The washing machine according to claim 2, wherein said actuator disc has a marked discontinuity oriented to a magnetic field of said rotor in a spatially fixed and pre-known relationship and said synchronization logic unit is activatable thereby.

5. The washing machine according to claim 4, wherein said marked discontinuity is in a form of interrupted or multiple pulse deliveries from said pulse sender.

6. The washing machine according to claim 2, wherein said processor causes a steady feeding of direct current to said drive motor at a beginning of operation until said rotor, being a permanent-magnetic rotor, has rotated relative to said stator into a rotary position corresponding to that field direction, whereupon said synchronization logic unit is activated and operation of said drive motor is started with a rotating field by way of said process-controlled inverter.

7. The washing machine according to claim 2, wherein said synchronization logic unit responds to in-phase relationship of a motor current with a terminal voltage induced by said rotor during a passage through zero of the motor current through that winding line of said stator.

8. The washing machine according to claim 1, wherein said pulse sender operates optoelectronically in a manner of a transmission-type light barrier configuration and a spacing of said actuators on said actuator disc defining a sequence of openings.

9. The washing machine according to claim 1, wherein:
   said actuators are reflectors; and
   said pulse sender operates optoelectronically in a manner of a reflection-type light barrier configuration with a sequence of said reflectors disposed on said actuator disc.

10. The washing machine according to claim 1, wherein said incremental sensor supplies pairs of counting pulses, said pairs being phase-displaced relative to each other, wherein any change in a direction of rotation of said rotor and thus said washing drum relative to said pulse sender which is fixed with respect to the washing machine is derived from a sequence of the counting pulses, for switching over a counting direction in said incremental counter.

11. The washing machine according to claim 1, wherein a number of said actuators on said actuator disc is an even multiple of a number of magnet dipoles of said rotor.

* * * * *